Sept. 20, 1966     B. BRYSON     3,273,776
NAILING MACHINE

Filed March 31, 1965     10 Sheets-Sheet 1

INVENTOR.
BOYD BRYSON
BY James J. Carmon
attorney

Sept. 20, 1966    B. BRYSON    3,273,776
NAILING MACHINE
Filed March 31, 1965    10 Sheets-Sheet 2
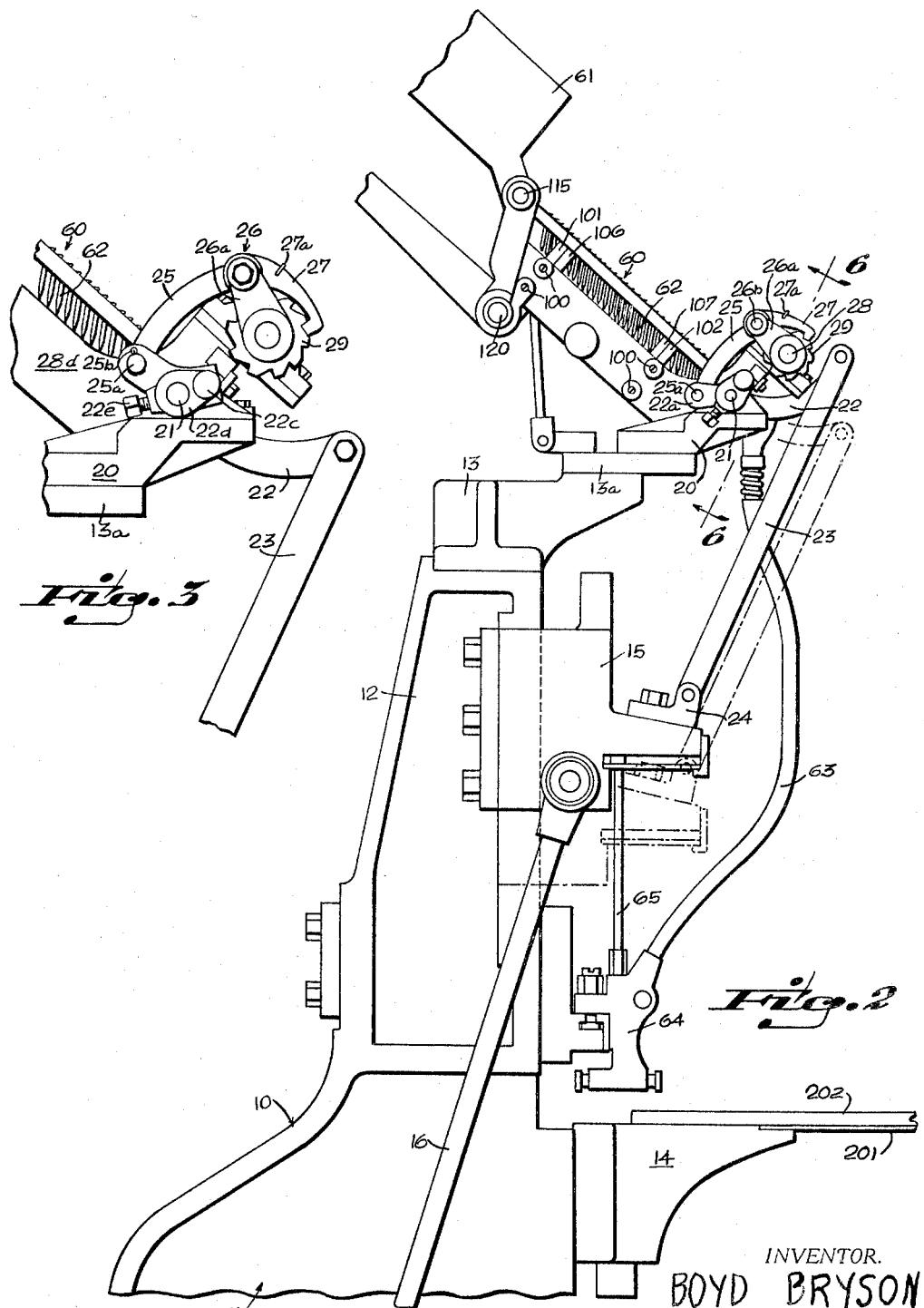
INVENTOR.
BOYD BRYSON
BY James J. Cannon
Attorney

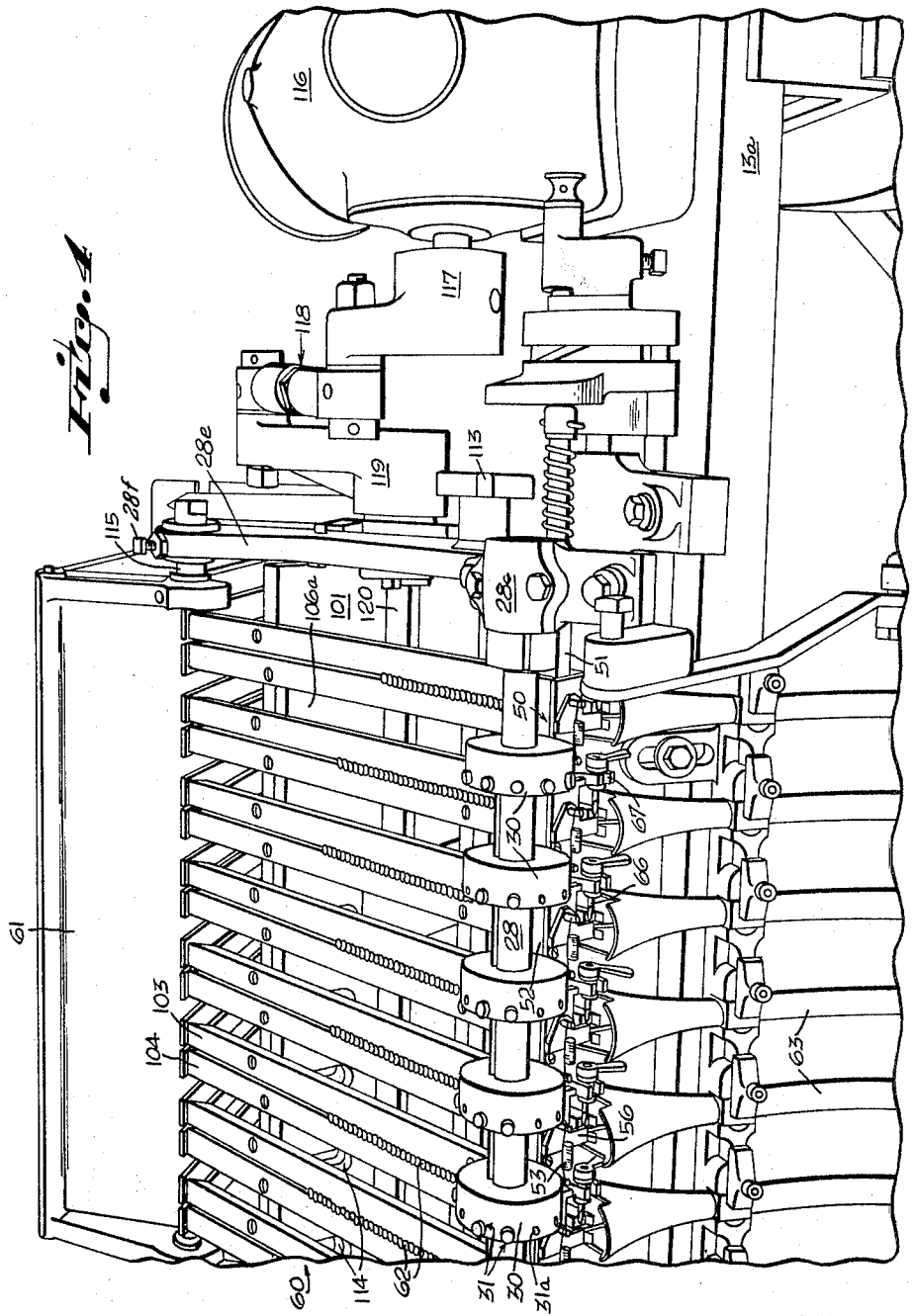

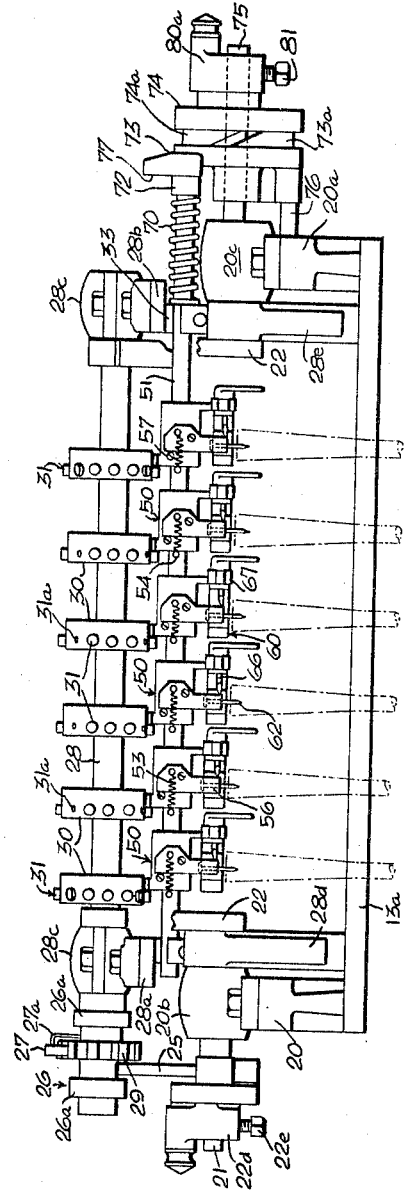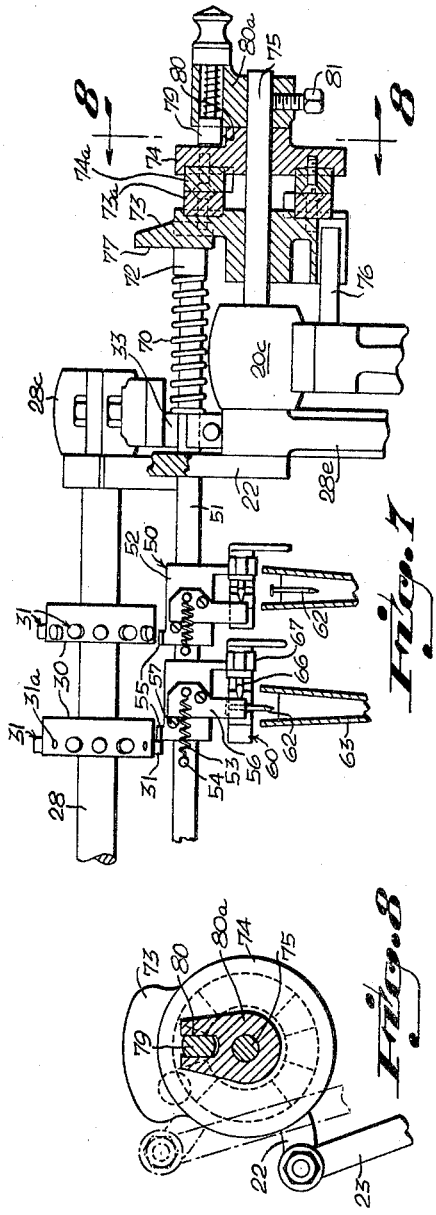
INVENTOR.
BOYD BRYSON

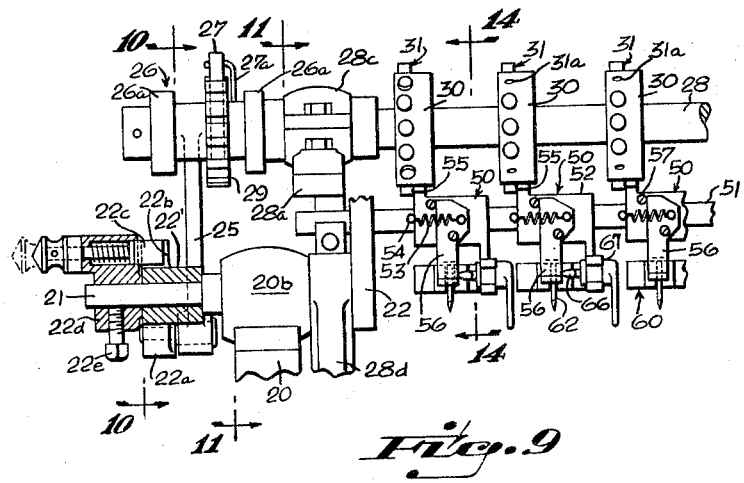
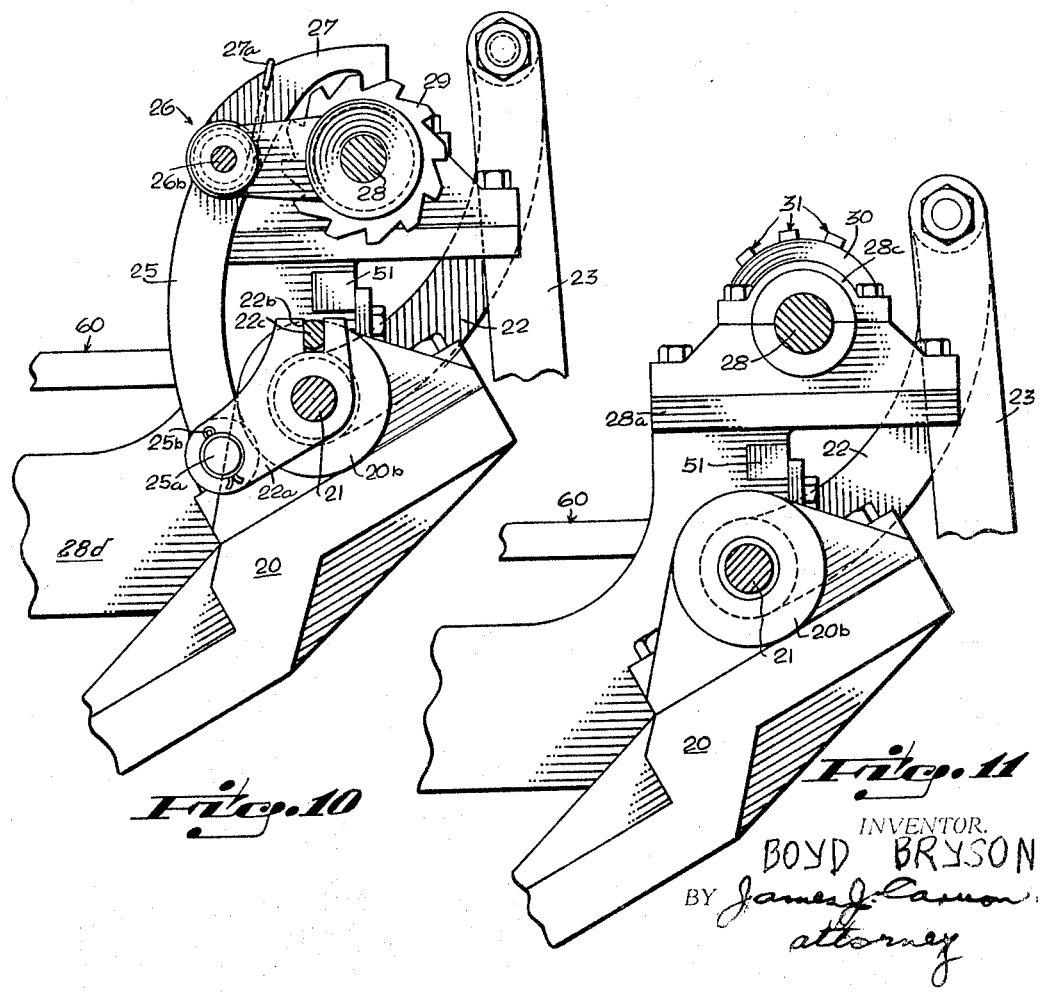

Sept. 20, 1966   B. BRYSON   3,273,776
NAILING MACHINE
Filed March 31, 1965   10 Sheets-Sheet 6

INVENTOR.
BOYD BRYSON
BY

Sept. 20, 1966    B. BRYSON    3,273,776
NAILING MACHINE
Filed March 31, 1965    10 Sheets-Sheet 7
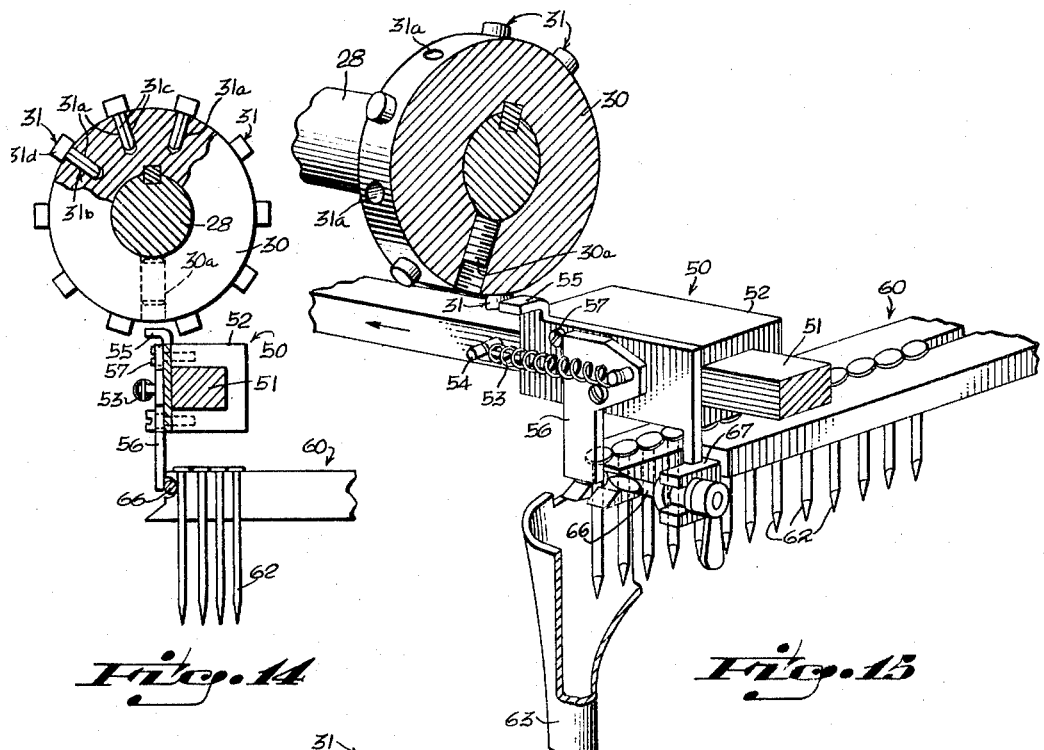
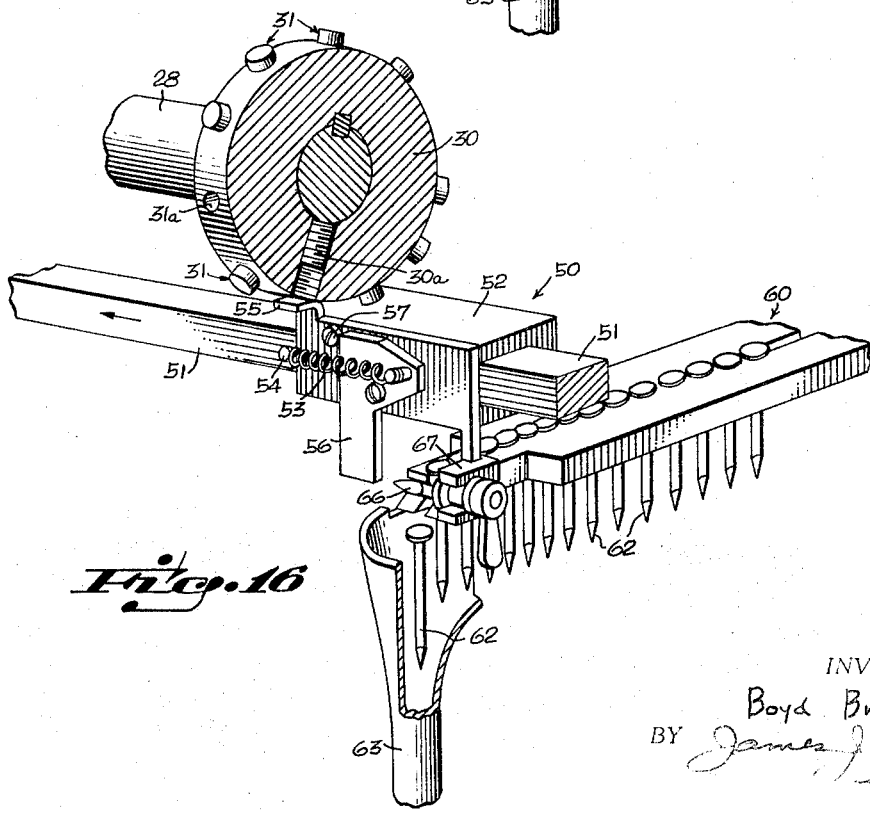
INVENTOR.
Boyd Bryson Sept. 20, 1966  B. BRYSON  3,273,776
NAILING MACHINE
Filed March 31, 1965  10 Sheets-Sheet 8

INVENTOR.
Boyd Bryson
BY

INVENTOR.
Boyd Bryson

Sept. 20, 1966     B. BRYSON     3,273,776
NAILING MACHINE
Filed March 31, 1965     10 Sheets-Sheet 10
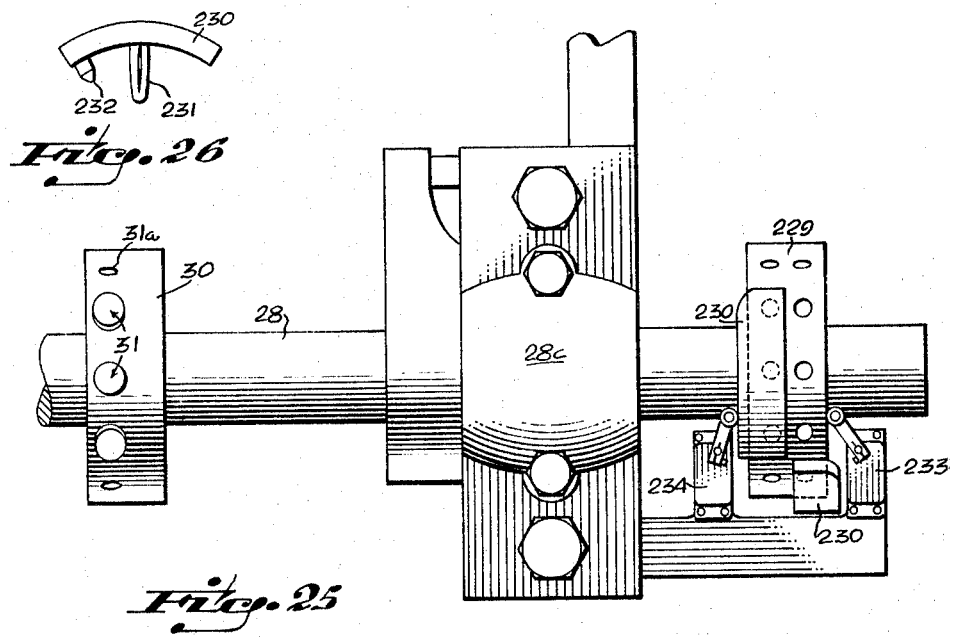
INVENTOR.
Boyd Bryson
BY United States Patent Office 3,273,776
Patented Sept. 20, 1966

3,273,776
NAILING MACHINE
Boyd Bryson, Wayne, N.J., assignor to William S. Doig, Inc., Haverstraw, N.Y.
Filed Mar. 31, 1965, Ser. No. 444,291
2 Claims. (Cl. 227—109)

My invention relates to improvements in nailing machinery, particularly with respect to the versatility of such machinery in their changeover from one adjustment to another of the number of nail groups and the number of nails in each group successively fed and applied in a predetermined program to workpiece runs having different nailing requirements; and is further directed to mechanism for automatically controlling the height of the work table to compensate for thickness of boards added in a nailing program.

In U.S. Patent No. 2,197,363, issued April 16, 1940 to William F. Harriet and assigned to William S. Doig, Inc. of Brooklyn, New York, the assignee of the present invention, there is disclosed a nailing machine which operates automatically to feed nails to the work in a desired order of nail group strokes and number of nails in each group determined by adjustment of the machine selectively varied at will by the operator. The present invention, generally, relates to improvements in that machine resulting in substantial time saving in change-over from one selective adjustment to another, and in increased versatility with respect to the selective use of nails, or other nail-like fasteners of a wide range of sizes in a given machine.

A more particular object of this invention is to provide improved and simplified mechanism in a nailing machine of the character above described whereby change-over between a nailing program requiring an even number of strokes or nailing groups to an odd number can readily be effected by the simple replacement of one feed governing mechanism for another. Further, an important feature of the present invention resides in the provision, in each of the feed governing mechanisms, of simplified means for selective change-over, in each nail group or strokes, of the number and position of the nails to be driven in that particular stroke, as determined by the particular nailing requirements of a new run of work to be nailed.

Still another object is to provide, in a nailing machine of the character described, means for automatically adjusting the height of the work table in a predetermined sequence during the course of a nailing program to accommodate for different thicknesses of the work occasioned by its positioning thereon or the assembly thereto of additional members for nailing.

Yet another object of the invention is to provide, in a nailing machine of the character above described, a feed chute mechanism selectively adjustable over a wide range for feeding nails or other nail-like fasteners in a wide range of sizes to the feed governing mechanism, and for simultaneously feeding different diametrical sizes of nails to the feed governing mechanism, and further including associated adjustable nail picker stroke mechanism which can readily be changed to accommodate any particular diametrical size of nail for the use of which the chute mechanism is adjusted.

Other objects, features and advantages of the invention will be apparent from the following description when read with reference to the accompanying drawings. In the drawings, wherein like reference numerals denote corresponding parts throughout the several views;

FIG. 2 is an enlarged side elevation of the upper portion of the machine;

FIG. 3 is an enlarged detail end view of the ratchet mechanism for actuating the selective nail feeding means;

FIG. 4 is a partial perspective view of the machine, as viewed from above;

FIG. 5 illustrates one of the banana plugs of the nail feeding means, shown separately;

FIG. 6 is a front elevation, partly in section on the line 6—6 of FIG. 2, showing details of the selective nail feeding means;

FIG. 7 is an enlarged detail front view, partly in section, showing the cam means at the right-hand end of the machine for adjustably actuating the nail picking or releasing means;

FIG. 8 is a detail view on the line 8—8 of FIG. 7;

FIG. 9 is a detail view showing the ratchet mechanism and associated parts at the left-hand end of the machine;

FIG. 10 is a detail section on the line 10—10 of FIG. 9;

FIG. 11 is a detail section on the line 11—11 of FIG. 9;

FIG. 14 is an enlarged detail section on the line 14—14 of FIG. 9 showing the selector mechanism in inoperative position;

FIG. 15 is an enlarged detail perspective view of the nail picking and releasing mechanism, showing the advanced nail held against discharge into the funnel of the nail chute by the control means;

FIG. 16 is a view similar to FIG. 15 with the advanced nail released by the control means;

FIG. 19 is a top view of a nailed panel requiring two nailing strokes;

FIG. 25 is a fragmentary view of the drum shaft illustrating a modification thereof for automatically actuating electrical switches controlling the height of the work table in timed sequence with a pre-set nailing cycle; and FIG. 26 illustrates, in side elevation, a three cycle cam segment for use with the modification of FIG. 25.

Figure 20:
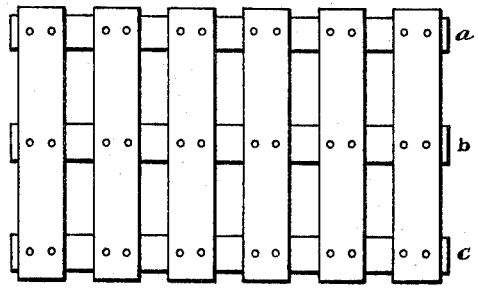
FIG. 20 is a top view of a warehouse pallet requiring six nailing strokes, nailed together by the nailing machine.

In the drawings, the machine is shown comprising a frame 10 including vertical side members 11 terminating at their reduced upper ends in extensions 12 connected by a transverse member 13. At the front of the frame is an adjustable work-support or table 14 to receive the parts to be nailed.

The numeral 15 denotes a cross-head which is slidably mounted on the extensions 12 of the frame and adapted to be reciprocated vertically through pitmans 16 each having one end pivotally connected to one end of the cross-head 15, and its other end pivotally secured to a crank 17 actuated from the main driving shaft 18 of the machine.

The transverse member 13 is provided with a feeder bed 13a fixed to each end of which is an upwardly and forwardly-extending feeder bed bracket 20, 20a. Secured to the feeder bed brackets 20, 20a are solid journal bearing members 20b, 20c. A short shaft 21 journalled in bearing member 20b is provided at its inner end with an arm 22 connected by a link 23 to the lug 24 mounted on the cross-head 15, whereby the shaft 21 may be oscillated from the cross-head. Upon the shaft 21 at the opposite side of its bearing is loosely mounted a sleeve 22' having an arm 22a. The sleeve 22' is provided with a recessed portion 22b adapted to receive a spring-actuated locking pin 22c carried by a collar or sleeve 22d secured to the shaft 21 by a set screw 22e. The collar 22d may be secured by the set screw 22e in various adjusted positions about the shaft 21 with the spring-actuated locking pin 22c engaged in the recessed-portion 22b to thereby lock the arm 22a to the shaft 21 in the desired angular position. The arm 22a is connected through link 25 to the swinging support 26 for the spring-pressed pawl 27 mounted thereon and adapted to engage a ratchet wheel 29 fixed to a shaft 28 adapted to be rotatively actuated thereby. The support 26 comprises a pair of arms 26a pivotally supported at corresponding ends about the shaft 28 at opposite sides of the ratchet wheel 29 and connected at their opposite ends by a shaft 26b. The pawl 27 is pivotally mounted upon the shaft 26b in position to engage ratchet wheel 29, and is retained in such engagement by the torsion spring 27a. The actuating link 25 is pivotally connected at one end to the shaft 26b and carried thereby, and at its opposite end to the arm 22a through a pivot pin 25a provided with a removable cotter pin 25b or like device for rendering the link 25 at the latter end readily disconnectable from the arm 22a for a purpose hereinafter more fully described.

The shaft 28 extends transversely across the machine, being secured to the forward ends of brackets 28a, 28b by split journal bearings 28c, said brackets being fixed at each side of the machine frame. The shaft 28 has fixed thereon at regular intervals drums 30 provided, adjacent to one side, a peripheral row of stop members 31, of a total number representing a multiple of certain lesser numbers corresponding to the number of operating strokes required per panel operated upon. A salient feature of my invention resides in the construction of the stop members 31 and the ease with which they can be removed and replaced in their respective drum openings 31a, for the purpose of varying the number and positions of nails or fasteners to be driven in each stroke of the machine, as is hereinbelow more fully described. To this end, as is illustrated in FIG. 5, the stop members 31 comprise a transversely resilient plug portion 31b having a plurality of leaf spring members 31c, of the type known as "banana" plugs, the upper end of which has affixed thereto as by molding or otherwise, a cylindrical head portion 31d. It will be apparent that with this construction it is a simple matter to remove or replace certain plugs in the drums 30 as required for a given pattern and stroke order in cyclic nailing or fastening, as is hereinbelow more fully described.

The shaft 28 is advanced step-by-step through operation of the ratchet 29, said ratchet having teeth corresponding in number with the number of stop members 31 on the drum 30. The pawl 27 engages the ratchet 29 for imparting step-by-step movement thereto.

The selective mechanism, whereby during each cycle of operation the number of nail feeding operations at the several stations may be differentially controlled, includes the series of drums 30, which are secured by set screws 30a to the shaft 28. The drums 30 correspond in number with the number of feed controllers 50 employed and are disposed in the path of the said controllers.

The feed controllers 50 are arranged in gangs upon the square shaft 51, and each consists of a slide member 52 slidably mounted upon said shaft 51, and normally held in position against a stop 54 fixed on the shaft 51 by means of a spring 53. At the forward side of each member 52 is secured an upwardly and forwardly-extending projection 55 which is adapted to engage with the stop member 31 of the contiguous drum 30. A vertical nail stop 56 is pivotally secured intermediate its ends to said slide member 52 and normally held in vertical position against a stop 57 by said spring 53 which is at one end secured to said stop 56, and at its other end secured to the stop 54 on said shaft 51. The lower end of stop 56 is adapted to engage with and close the open forward end of the corresponding slotted nail chute 60 by which the nails to be driven are conveyed from the hopper 61, as is hereinafter more fully described. The stop 56 controls the delivery of nails 62 to the open upper ends or funnels of the nail feed tubes 63 which are connected at their lower ends to the nail chucks 64 into which extend the plungers 65 secured at their upper ends to the cross-head 15 of the machine, and actuated thereby to drive the nails from said chucks 64 into the work. Each feed controller 50 is also associated with the usual cooperating nail pick 66 which is adjustably supported in a depending portion 67 fixed to the slide member 52 to hold back, within the nail chute 60, the line of nails when the nail stop 56 is actuated to release the foremost nail of the line at the discharge end of said chute 60 and cause the same to drop into the feed tube 63.

The stop members 31 of each drum 30 are spaced equally from each other. The stop members 31 are removably secured in the drums 30, as hereinabove described. The spring-loaded quick change stop members 31 are adapted to be successively moved into the path of movement of the corresponding feed controllers 50, said feed controllers being provided with projections 55 adapted to engage stop members 31 extending into the path thereof upon reciprocation of the square shaft 51. The step-by-step rotary movement is imparted to the shaft 28, and the drums 30 secured thereto, through the operation of the ratchet wheel 29. When the rows of stop members 31 consist of ten lugs or screws the ratchet wheel 29 is provided with the corresponding number of teeth so that a complete revolution of the shaft 28 will represent ten steps of movement. By removing one or more of the stop members of the row thereof in each drum or at each station, the number of nailing operations effected at the several stations during a cycle of operation may be selectively determined. The selective adjustment thus made determines the number of nails and the location thereof driven at each stroke of the head 15 and supplied to one or more of the chucks 64. Upon the successive strokes constituting a complete cycle of operaton of the machine, the nails are supplied and applied to the work in the same or different numbers and in various sequential orders. When it is desired to feed nails continuously at any one station all of the stop members 31 may be removed so as not to impede the movement of the associated slide member 52.

Figure 21:
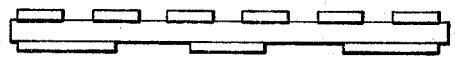
FIG. 21 is a side elevational view of the pallet.
Figure 22:
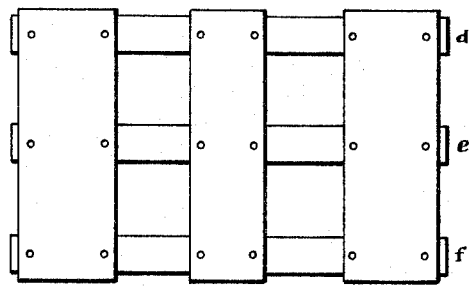
FIG. 22 is a bottom view thereof.

As described above, the machine is adapted to operate continuously upon a uniform run of work which is subjected to strokes, or has applied thereto lines or groups of nails or other fasteners all of a number constituting a divisor of "ten," the stop members 31 in said row being ten in number. The machine is thus capable of operating continuously and in proper sequential order upon successive panels which are termed herein as a "two-stroke" panel, such as that shown in FIG. 19. When it is required to operate continuously upon a uniform run of work in which the strokes to be applied thereto are divisors of a number other than "ten," such as upon the "three-stroke" panel illustrated in FIGS. 20, 21 and 22, the shaft 28 together with its associated parts can readily be removed as a unit by unfastening the split journal bearings 28c, and disconnecting the link 25 by removal of the cotter pin 25b as hereinabove described, and replaced with a shaft having drums with twelve stop members in each row. With such drums, work requiring 3 or 6 or any other number of strokes divisible by twelve can be cyclically operated upon, such as the six stroke warehouse pallet illustrated in FIGS. 20, 21 and 22, for example wherein in the top deck (FIG. 20) 12 nails are driven through six boards for three strokes (strokes *a*, *b* and *c*), after which the pallet is turned over and six nails are driven through three boards for three strokes (strokes *d*, *e* and *f*). It will be understood that a twelve drum machine would be needed to simultaneously drive the twelve nails of the first three strokes (strokes *a*, *b* and *c*) and that in the fourth, fifth and sixth strokes (strokes *d*, *e* and *f*), stop members 31 would be inserted in the fourth, fifth and sixth drum roll holes of the drum corresponding to the positions where nails are not needed. Thus, as above described, the selector mechanism having the "twelve stops" renders the machine available for operation continuously and in proper sequential order upon a succession of work, such as two, three, four, and six stroke panels, the stroke numbers being divisors of twelve.

Figure 17:
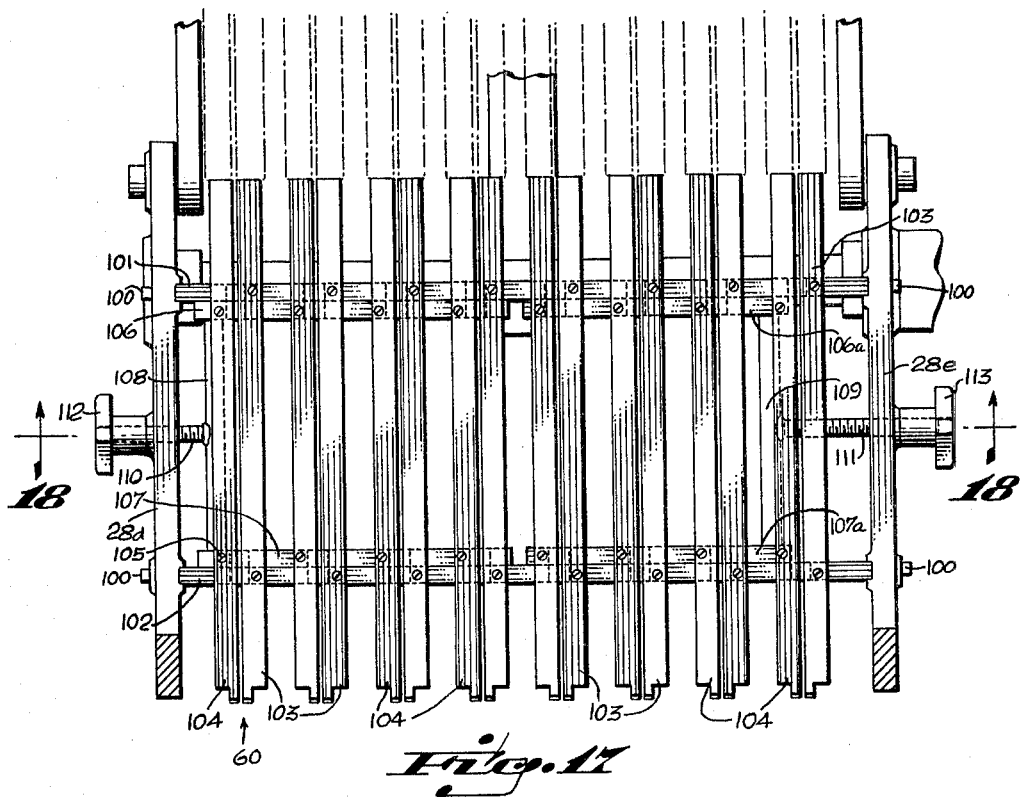
FIG. 17 is a top plan view of the adjustable nail feeder track mechanism.
Figure 18:
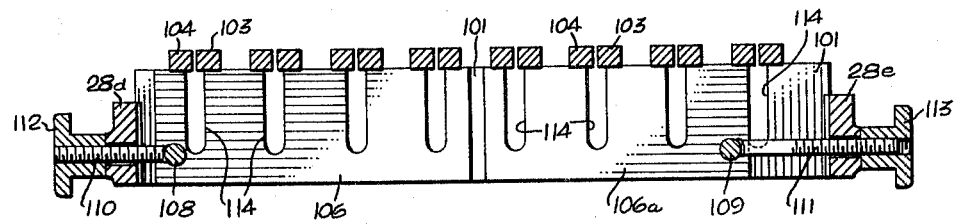
FIG. 18 is a vertical cross-sectional view taken along the line 18—18 of FIG. 17.
Figure 23:
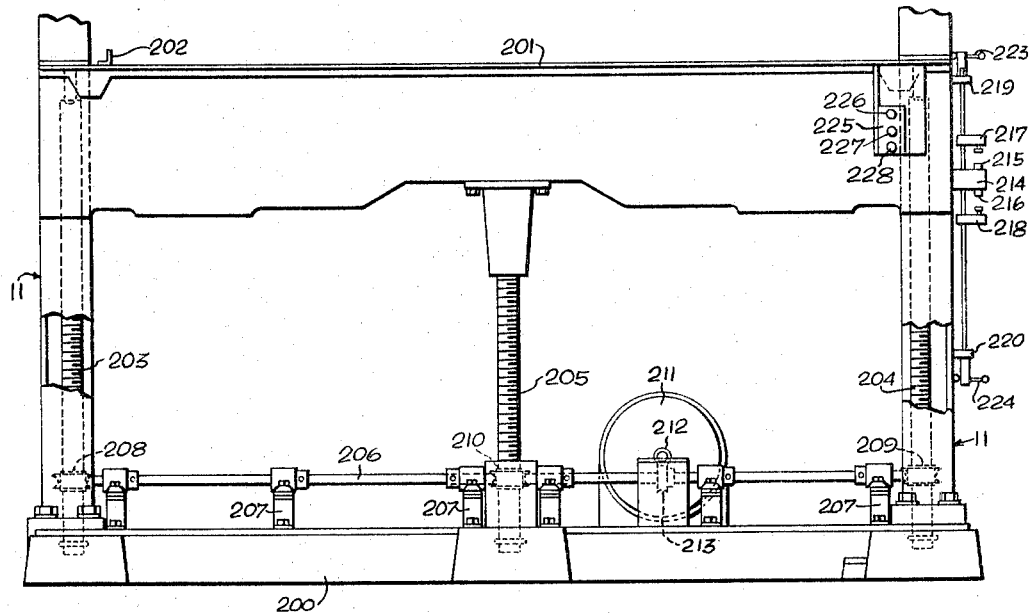
FIG. 23 is a partial front view of the nailing machine illustrating details of the automatic height control mechanism associated with the work table.
Figure 24:
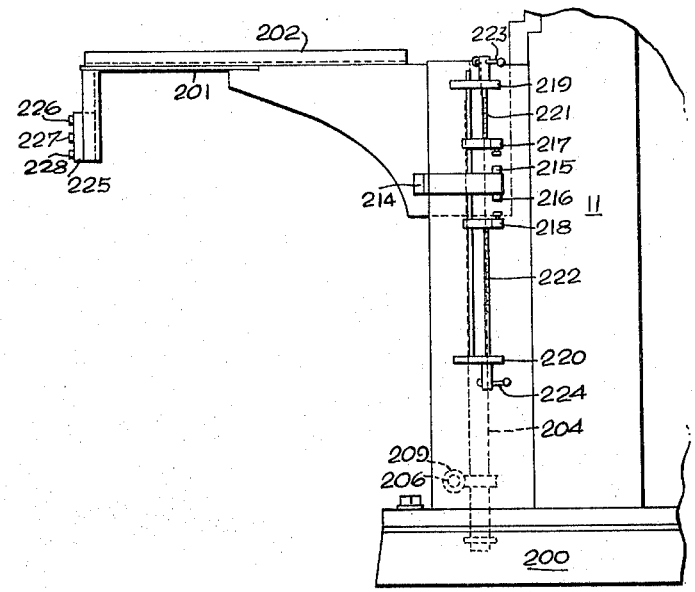
FIG. 24 is a side elevational view of the table height control mechanism illustrated in FIG. 23.

In FIGS. 6 to 8 is shown the cam mechanism for actuating the shaft 51, which is returned to and maintained in normal position by a spring 70 mounted upon the right hand end of the said shaft 51 between the frame members 33 and a head 72 fixed on said shaft 51. The cooperating cam members 73, 74 have cooperating replaceable hardened cam inserts 73a, 74a which can readily be exchanged by means of flat head screws for varying stroke or length of movement and speed of movement of shaft 51 and nail pick 66 in accordance with the diameter of the nail, bolt or other fasteners being used, as is hereinbelow more fully described. In this connection, a salient feature of my improved nailing machine resides in the provision of an adjustable nail chute mechanism by means of which nails or other fasteners of a wide range of sizes or diameters may be utilized. To this end, as best illustrated in FIGS. 17 and 18, the frame brackets 28d, 28e have secured therebetween as by machine screws 100, a pair of transverse support bars 101, 102 to which are secured the right hand guide track members 103 of each of the nail chutes 60, there being one chute for each of the nail pickers 66. The left hand guide track members 104 rest upon the support bars 101, 102, and are secured, as by machine screws 105, to axially aligned pairs of transverse bars 106, 106a and 107, 107a respectively. The outer ends of the transverse bars 106a, 107a are joined by a connector bar 109, and the outer ends of transverse bars 106, 107 are joined by a connector bar 108. Threaded rods 110, 111 extend outwardly from central positions of the connector bars 108, 109 through openings (not numbered) in the frame brackets 28d, 28e, and are fitted with internally threaded handwheels 112, 113 threadable against the outer surfaces of said brackets, respectively. By means of this construction, it will be apparent that by threading in and out of the handwheel 112, the four left hand guide track members 104 at the left side of the machine will be moved as a unit in parallelism with their associated right hand guide track members 103 to increase or decrease the track slot width as may be necessary to accommodate a different size nail or other fastener to be used in the machine. By threading in and out of the handwheel 113, the four left hand guide track members at the right side of the machine can be moved as a unit in parallelism with their associated right hand guide track members to similarly increase or decrease track slot width as required. As shown in FIG. 18, the transverse support bars 101, 102 are provided with vertical openings 114 under the track slots to allow passage of the nails 62. As described above, the hardened cam inserts 73a, 74a can readily be replaced to provide the variation in nail picker stroke required by a change in the size of the nails or other fasteners being fed by the machine.

Figure 1:
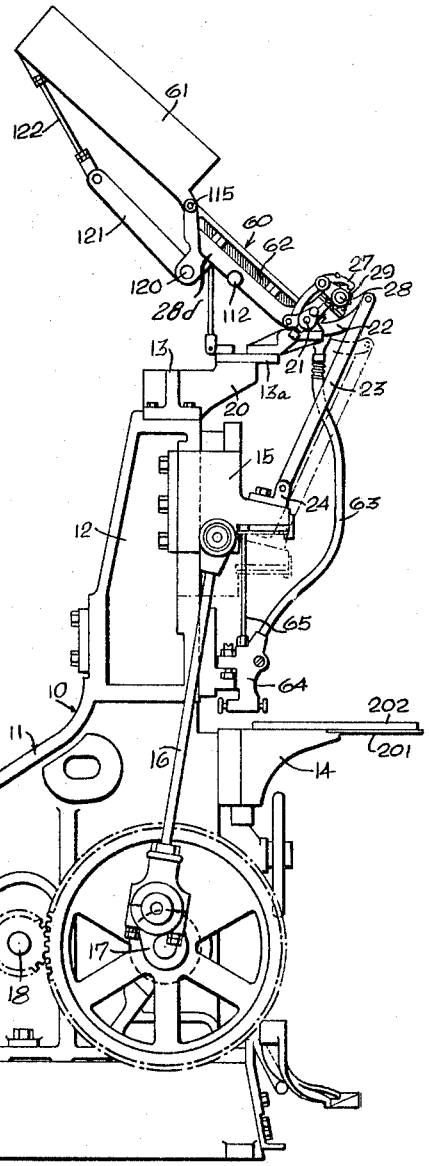
FIG. 1 is a side elevation of an improved nailing machine embodying the invention.
Figure 12:
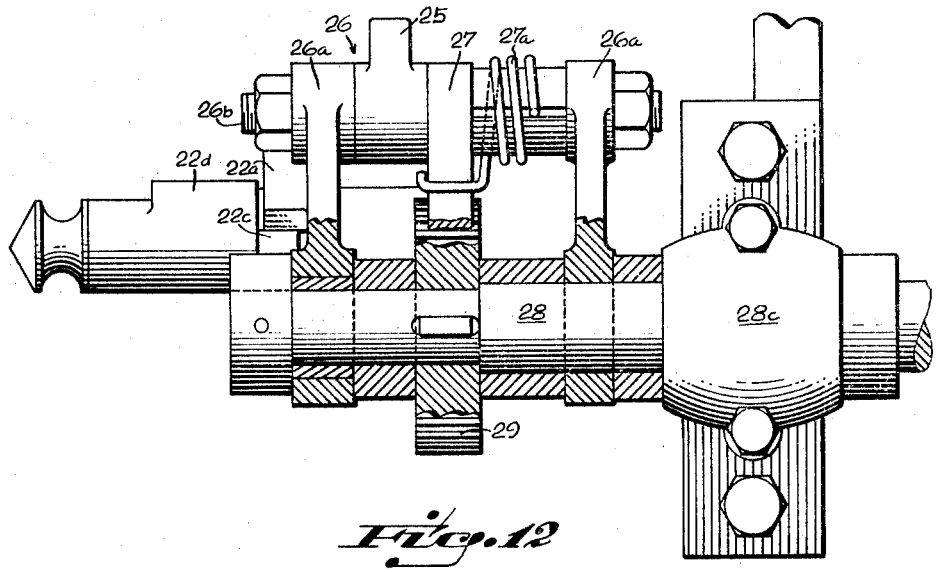
FIG. 12 is a detail plan, partly in section, showing the ratchet mechanism for actuating the selective mechanism.
Figure 13:
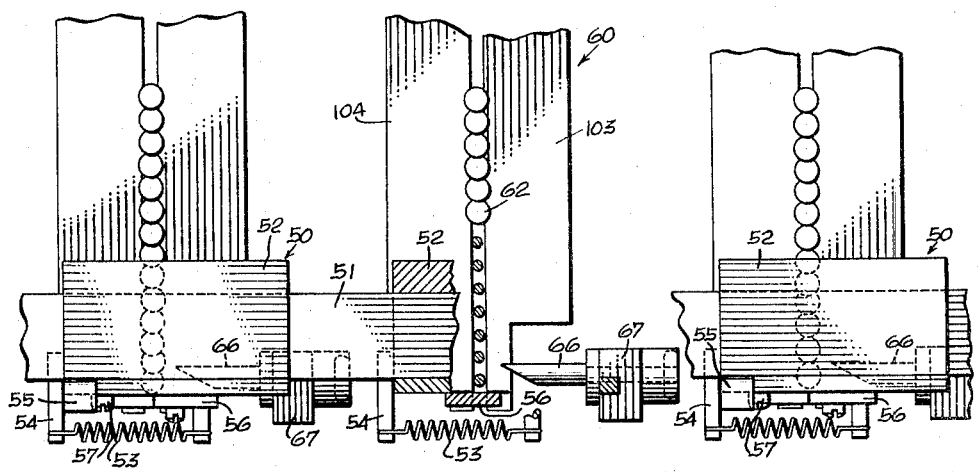
FIG. 13 is a detail horizontal section showing the nail guides, and the means for picking and releasing the nails.

As illustrated in FIGS. 1, 2 and 4, the hopper 61 is pivotally supported at its lower end between adjustable, eccentric stud shafts 115 at the rearward and uppermost end of the frame brackets 28d, 28e. The stud shafts 115 are each provided with two diameter portions along their lengths with one diameter portion off-set with respect to the axis of the other diameter. The outer diameter portions of the shafts 115 are adjustably fixed with respect to the frame brackets 28d, 28e by set screws 28f. The hopper 61 is reciprocated for nail feed to the guide tracks by a separate electric motor 116 secured at one side of the feeder bed 13a of the machine. To this end, the output shaft of the motor 116 is fitted with a crank shaft 117 which connects, through a short adjustable link 118 to one end of a crank shaft 119 the other end of which is secured to a shaft 120 journalled between frame brackets 28d, 28e. An actuating arm 121 secured to the shaft 120 centrally therealong has pivoted to its outer end an adjustable link 122 pivotally connecting with the underside of the hopper 61 at its outermost end. The crank shaft 117, the link 118 and the crank shaft 119 are of such size as to rotatively oscillate the shaft 120 to a degree needed for agitating the hopper 61 sufficiently for feeding nails to the nail chutes 60.

The cam member 73 is loosely mounted and slidable upon an axial shaft 75, and is retained against rotation with the shaft 75 by sliding engagement with the parallel stud 76. The member 73 is provided at its extended upper portion with a bearing face 77 normally in engagement with the head 72 on the end of shaft 51 and exerts, when actuated, a normal pressure upon the shaft 51 only. The cam member 74 is also mounted upon the shaft 75 for rotary movement relative thereto. The said shaft 75 is rotated or oscillated by the cam arm 22, and the cam member 74 is locked to the shaft 75 by means of a spring actuated pin 79 engaging with a recess 80 in said cam member 74. The pin 79 is mounted in a housing 80a secured to the shaft 75 by a screw 81.

Upon each nailing stroke of the machine the shaft 51 is reciprocated by the cam mechanism 73, 74, the speed and stroke imparted to said shaft being determined by the thickness of the cam inserts or segments 73a, 74a, and their cam angles, as hereinabove described. When a finger 55 of any control 52 engages a stop member 31 the control remains relatively stationary to prevent the feed at the corresponding position (see FIG. 7). The nail stops 56 carried by the members 52 are pivotally mounted and retained in engagement with the stops 57 by the springs 53 to enable the nail stops 56 to yield upon the return movement of the shaft 51 should a bent or defective nail become lodged in the discharge chute 60 in the path of any nail stop 56. During the cycle of operation of the machine the shaft 28 and the selective means carried thereby is advanced step-by-step by the action of the pawl 27 upon the ten-toothed ratchet 29. The pawl 27 is actuated from the head 15 through the transmission means 23, 22, 21, 22a, 25 and 26.

The selector mechanism may be prevented from operating by withdrawing the pin 22c from its socket, which disconnects the ratchet mechanism from the oscillating shaft 21 and by rotating the shaft 28 slightly by hand to bring the spacings between adjacent stop members opposite the projections 55 as shown in FIG. 14. Upon said adjustment the nails will be continuously fed from all of the stations.

FIGS. 23 through 26 illustrate a modification of the invention for automatically controlling the height of the work table, to compensate for thickness of boards added in a nailing program, for example. In this embodiment, the vertical side members 11 of the machine frame, which extend upwardly at each side of the machine base 200, have arranged therebetween, in vertically sliding disposition, a transverse work table 201 having at one side an angle iron work index or stop member 202. Vertically arranged table screws 203, 204 journalled at their lower ends at each side, and 205, in the center of the machine base 200, extend into internally-threaded openings in the table 201 for raising or lowering it when turned in unison in one direction or the other. A transverse drive shaft 206 journalled upon the machine base 200, as by bearings 207, carries worm gears 208, 209 and 210, in mesh, respectively with the vertical table screws 203, 204 and 205. A reversible electric drive motor 211 secured to the machine base 200 carries on its output shaft a worm gear 212 in mesh with a gear 213 secured to the drive shaft 206.

Means is provided for control of the drive motor 211 for automatically adjusting the height of the work table 201 by predetermined circuits during the course of a nailing program. To this end, the work table 201 has fixed at one side a bracket 214 carrying upper and lower abutment members 215, 216, respectively. The abutment members 215, 216 are vertically aligned, respectively, with upper and lower electrical limit switches 217, 218, respectively, supported on brackets 219, 220, threadedly arranged on respective screw rods 221, 222 journalled in vertical disposition against the outside of the right hand machine side member 11, above and below the bracket 214. The upper end of the screw rod 221 and the lower end of the screw rod 222 are fitted with slidable cross-bars 223, 224 for individual adjustment of the heights of the limit switches 217, 218. The limit switches 217, 218 are connected in the energization circuit for the reversible drive motor 211 so as to open circuit and thereby stop the drive motor when the limit position of the work table 201, as determined by the vertical adjustment of said limit position switches, is reached. The electrical circuitry for reversible motors, being well known, is not detailed herein, it being understood that the upper limit switch 217 is so connected as to open the energization circuit to the motor when turning in the direction to raise the work table, and that the lower limit switch 218 is so connected as to open the energization circuit to the motor when turning in the direction to lower the work table. A manuel control box 225 having switch buttons 226, 227 and 228 connected in circuitry for respectively raising, lowering and stopping the work table 201 is provided as an auxiliary means for adjusting table height.

The means for automatically readjusting the height of the work table 201 during the course of a nailing program to automatically compensate for increased thickness in the work in the progress of its assembly also comprises an auxiliary drum 229 (FIG. 25) secured to an extension of the machine drum shaft 28 for rotation in unison therewith and adapted to carry arcuate cam segments 230 (FIG. 26) adjustably and removably inserted in each side of the drum 229 in accordance with the nailing program or cycle of the nailing work for which the machine is set up. As illustrated in FIG. 26, the cam segments 230 are provided at the inside with central banana plug members 231 and index projections 232 at one end, whereby they can readily be inserted in adjusted position, in each side of the cam drum 229 for controlling by means of their sidewardly-extending cam surfaces, the actuation of "up" and "down" energization switches 233, 234, respectively in the electrical energization circuit for the table height control drive motor 211. With this arrangement it will be evident that during the course of a nailing cycle or program the table will be automatically raised or lowered, by amounts predetermined by the setting of the screw rods 221, 222, to accommodate for changes in thickness in the work at a particular step in its cycle or program of operations. For example, in the description of machine operation given above with respect to the nailing of the warehouse pallet illustrated in FIGS. 20, 21 and 22, the cam segments would be of such extent and so disposed as to actuate their associated "up" and "down" switches 234, 233 to lower the table to the preset positon after the three boards of the bottom section are added, to automatically compensate for this added thickness in the work at this step in the cyclical nailing operation of the workpiece or pallet.

While I have illustrated and described herein only two forms in which the invention can conveniently be embodied in practice, it is to be understood that these forms are given by way of example only and not in a limiting sense. The invention, in brief, comprises all the embodiments and modifications coming within the scope and spirit of the following claims.

What I claim as new and desire to secure by Letters Patent is:

1. In a nailing machine, the combination comprising, feed mechanism having means for controlling the feed of nails, a plurality of selectively adjustable feed governing means capable of cyclically performing successive governing operations differing from each other in accordance with the selective adjustment of each, means for selectively rendering one of said governing means operative with relation to said controlling means by its attachment to said machine in substitution for another of said governing means, and means for actuating the selected feed governing means, said nail feed controlling means comprising a hopper, means for agitating said hopper, a plurality of nail guide tracks extending between said hopper and said feed governing means, said guide tracks each defining a slot for the passage of nails or the like fasteners, said guide tracks comprising two groups of a plurality of guide tracks each, and means for separately adjusting the width of the slots of each of said groups to simultaneously accommodate nails of two different sizes.

2. A machine of the character described including a nail feed mechanism comprising a plurality of nail feeding means, means for controlling the discharge of nails from the several nail feeding means, feed governing means including a row of projecting stop members associated with said controlling means at each of said nail feeding means, means for supporting the several feed governing means for rotation as a unit, means for rotatively advancing said supporting means, said stop members comprising stud shaft portions frictionally received in openings in said controlling means, said feed governing means comprising a plurality of cylindrical drums, one for each of said nail feeding means, a plurality of radially-extending, peripherally-spaced openings in each of said drums, means for selectively frictionally attaching said stop members in said openings, said stop members each comprising a stud shaft portion receivable in said openings and an outwardly-projecting head portion, a work table for supporting work to be nailed, means for driving nails advanced by said nail feed controlling means into work supported on said work table, means controlled by said feed governing means for automatically adjusting the height of said work table, said work table height adjusting means comprising a reversible electric motor, vertically arranged upper and lower limit switches positioned to be actuated upon said work table reaching predetermined upper and lower positions, a rotary member fixed for rotation with said rotatively advancing means, replaceable cam means on said rotary member, and a pair of up and down limit switches positioned to be actuated by said cam means during the cylic operation of said feed governing means.

References Cited by the Examiner

UNITED STATES PATENTS

| | | | |
|---|---|---|---|
| 586,711 | 7/1877 | Morgan | 227—117 X |
| 1,226,907 | 5/1917 | Northrup | 227—117 X |
| 2,197,363 | 4/1940 | Harriett | 227—116 X |
| 2,636,168 | 4/1953 | Wright et al. | 227—154 X |
| 2,669,715 | 2/1954 | Stilwell | 227—154 |

GRANVILLE Y. CUSTER, JR., *Primary Examiner.*